(12) United States Patent
Hubicki

(10) Patent No.: US 6,615,107 B2
(45) Date of Patent: Sep. 2, 2003

(54) AUTOMATED SYSTEM AND METHOD FOR DISPENSING MEDICATIONS FOR LOW VISIONS ELDERLY AND BLIND INDIVIDUALS

(76) Inventor: Joseph T. Hubicki, 67 Dawn Dr., Churchville, PA (US) 18966

( * ) Notice: Subject to any disclaimer, the term of this patent is extended or adjusted under 35 U.S.C. 154(b) by 0 days.

(21) Appl. No.: 09/912,660

(22) Filed: Jul. 25, 2001

(65) Prior Publication Data

US 2003/0019879 A1 Jan. 30, 2003

(51) Int. Cl.[7] .............................................. G06F 17/00
(52) U.S. Cl. ....................................................... 700/237
(58) Field of Search ................................ 700/237, 241, 700/242; 368/10, 11

(56) References Cited

U.S. PATENT DOCUMENTS

| | | | | |
|---|---|---|---|---|
| 5,159,581 A | * | 10/1992 | Agans | 206/538 |
| 5,408,443 A | * | 4/1995 | Weinberger | 221/3 |
| 5,646,912 A | * | 7/1997 | Cousin | 221/15 |
| 5,752,235 A | * | 5/1998 | Kehr et al. | 705/3 |
| 5,752,621 A | * | 5/1998 | Passamante | 221/13 |
| 5,826,217 A | * | 10/1998 | Lerner | 221/15 |
| 6,169,707 B1 | * | 1/2001 | Newland | 221/2 |
| 6,294,999 B1 | * | 9/2001 | Yarin et al. | 340/573.1 |
| 6,314,384 B1 | * | 11/2001 | Goetz | 702/177 |

* cited by examiner

Primary Examiner—Donald P. Walsh
Assistant Examiner—Joseph Rodriquez
(74) Attorney, Agent, or Firm—LaMorte & Associates

(57) ABSTRACT

A system and method of dispensing medications for low vision elderly and blind individuals. The system includes a storage assembly that contains a plurality of different compartments that are identified in Braille and with large raised letters. Each prescription of a person is placed in a separate compartment. A microprocessor is contained within the storage assembly. The microprocessor is programmed with the times that each of the medications in each of the compartments is to be taken. At the appropriate times, the microprocessor opens the compartment containing the medication that should be taken. A person, upon notification by a vibrating paging unit, then goes to the storage assembly and takes the medication contained within that compartment. A portable unit is carried by the person using the system. The portable unit interconnects with the main storage assembly when not in use. When connected to the storage assembly, data regarding the times of the prescription dosages is read to the portable unit.

17 Claims, 5 Drawing Sheets

AUTOMATED SYSTEM AND METHOD FOR DISPENSING MEDICATIONS FOR LOW VISIONS ELDERLY AND BLIND INDIVIDUALS

BACKGROUND OF THE INVENTION

1. Field of the Invention

The present invention relates to systems and methods that are used to dispense medications to low vision elderly and blind individuals and monitor if those medications have been taken in a timely manner. More particularly, the present invention relates to systems and methods that retain a supply of medications and dispense the medications at preprogrammed time intervals.

2. Prior Art Statement

In developed countries, the life expectancy of the average person has increased significantly within the past few decades. One of the largest reasons for this increase in life expectancy is the development of pharmaceuticals that treat many of the diseases that commonly develop as a person ages. It is therefore not uncommon for an elderly person in a developed country to be taking at least one prescription pharmaceutical as part of a daily medication routine. Many low vision elderly and blind people, who have multiple ailments, may take several prescription pharmaceuticals each day in order to preserve health and treat existing disease.

Many prescription pharmaceuticals must be taken multiple times each day at regular intervals. When a person takes such prescription pharmaceuticals day after day, it is often difficult for that person to accurately remember whether or not he/she has taken the medication at the appropriate time. This problem is especially prevalent with elderly people who have natural memory degradation caused by age. The result is that a person may take the medication twice in a short period, thus taking an overdose. Alternatively, that person may not take the medications at all, thus taking an under dose. Both scenarios have the potential of adversely affecting the health of the person.

The prior art is replete with devices that have been designed to help a person remember whether or not they have taken their medications at the proper times. However, few of these prior art devices are specifically designed to help low vision or blind individuals. The simplest of these prior art devices is the pillbox. Pillboxes are compartmented boxes in which a person places their medications. At certain times during the day, a person takes the pills that are placed in the appropriate compartment. By seeing which of the compartments are empty and which of the compartments are still full, a person can determine whether or not the medications were taken or forgotten.

A problem associated with the use of pillboxes is that the pillboxes can only be used with pills. They cannot be used with medications that are in a liquid, powder, cream or aerosol form, such as eye drops, insulin and the like. Furthermore, if a person forgets to use the pillbox, the pillbox has no mechanism for warning a person that a certain medication dosage has been missed. Rather, a person will only come to that determination the next time they use the pillbox and see that a dosage is still present that should have been taken.

Recognizing the problems associated with static pillboxes, more sophisticated systems have been developed. In these systems, microprocessors are programmed with medication schedules. The microprocessors then actively inform a person that medication should be taken using existing telecommunications equipment such as telephones, beepers and two-way pagers. Such prior art systems are exemplified by U.S. Pat. No. 5,657,236 to Conkright, entitled Medication Dispensing And Timing System Utilizing Patient Communicator With Internal Clock. A problem associated with such sophisticated monitoring systems is that they are very expensive to use and difficult to program. Consequently, such systems do not appeal to many senior citizens who have limited incomes and little experience in programming high-tech equipment.

A need therefore exists for a system and method of dispensing medications to a low vision elderly or blind patient that actively informs a patient of medication times, yet is inexpensive and simple to use. A need also exists for a medical dispensing device with large lettering, controls and Braille labels that enable the device to be used by the visually impaired. These needs are met by the present invention as described and claimed below.

SUMMARY OF THE INVENTION

The present invention is a system and method of dispensing medications. The system includes a storage assembly that contains a plurality of different compartments. Each compartment has associated controls that are identified with both large raised lettering and in Braille to assist the visually impaired. The front of each compartment also contains a label of raised letters and Braille to assist the visually impaired. Each prescription of a person is placed in a separate compartment. The prescription can be a bottle of pills, a tube of cream, an inhaler canister, a vial of liquid or a can of powder. A microprocessor is contained within the storage assembly. The microprocessor is programmed with the times that each of the medications in each of the compartments is to be taken. At the appropriate times, the microprocessor opens the compartment containing the medication that should be taken. A person, upon realizing that a compartment has been opened, then takes the medication contained within that compartment.

A portable unit is carried by the person using the system. The portable unit interconnects with the main storage assembly when not in use. When connected to the storage assembly, data regarding the times of the prescription dosages are sent to the portable unit. Once removed from the storage assembly and carried by a person, the portable unit provides an indication of when that person should return to the storage assembly to take his/her medications.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention system and method can be used to dispense any material, such as vitamins, in a programmed schedule, the present invention system and method are particularly well suited for dispensing medications. As a result, the exemplary embodiment of the present invention system and method will be described in use dispensing medications in order to set forth the best mode contemplated for the invention.

Figure 1:
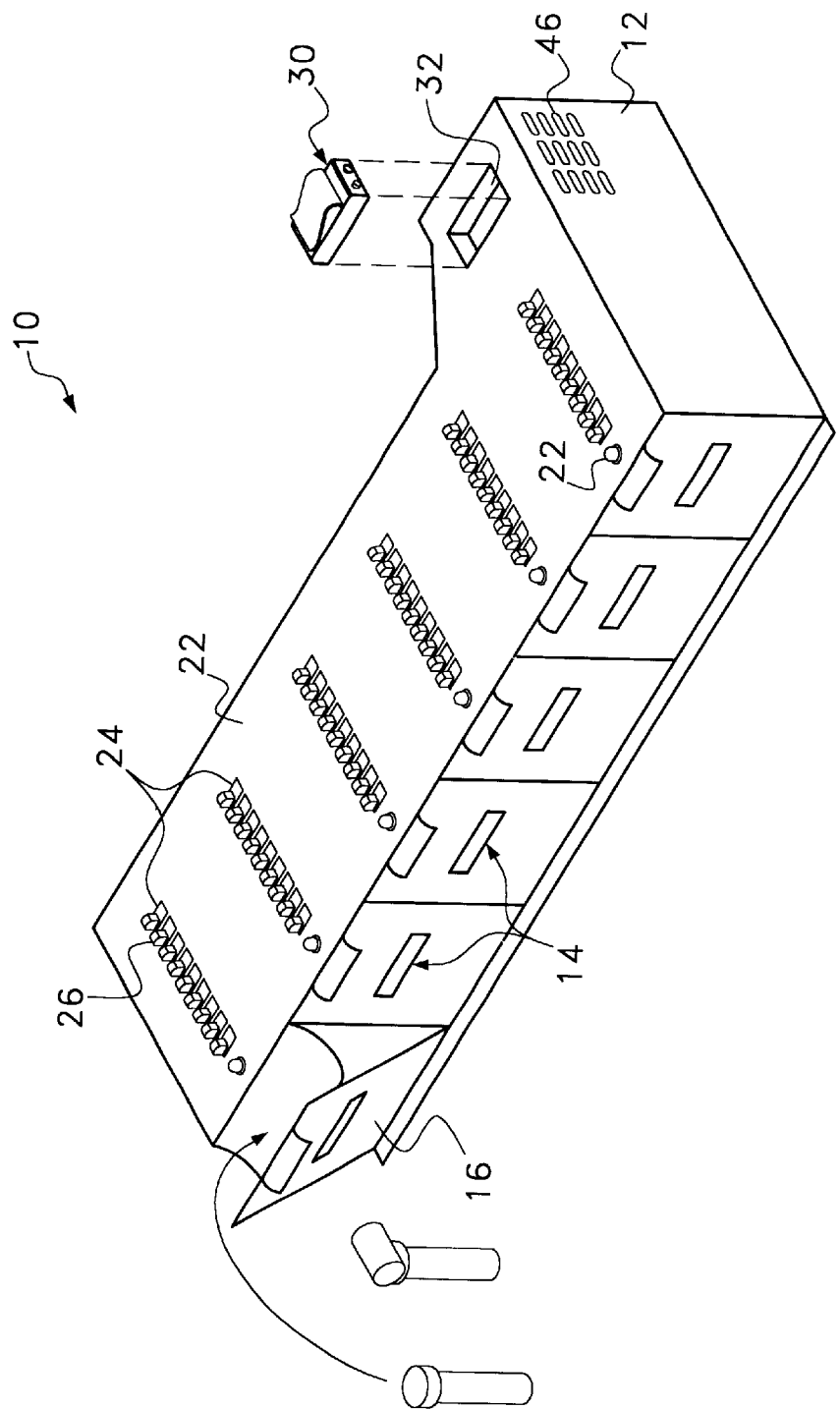
FIG. 1 is a perspective view of an exemplary embodiment of a dispensing system in accordance with the present invention.

Referring to FIG. 1, an exemplary embodiment of the present invention dispensing system 10 is shown. The dispensing system includes a main storage unit 12. The main storage unit 12 contains a plurality of compartments 14 that are accessible with doors 16. The main storage unit 12 preferably has at least three compartments. However, a single compartment or any plurality of compartments can be used. The compartments 14 are large, wherein each compartment is capable of retaining at least one standard prescription bottle, an inhaler, and/or a tube of cream. A compartment volume of at least fifty cubic centimeters is preferred in order to adequately receive most prescription bottles, tubes and inhalers.

Within the main storage unit 12 are mechanisms that can automatically open and close the various compartment doors 16, under the control of a microprocessor.

On the face of each compartment door 16 is located a replaceable label 18. The label 18 is used to help identify the contents of the various compartments 14 when the compartments 14 are stocked with medications. If desired, the labels 18 can be printed in Braille to assist the use of the system 10 by the visually impaired.

The main storage unit 12 also contains an indicator 20 for each of the compartments 14. The indicators 20 can be electrical components, such as a light emitting diodes, audible components, such as buzzers, or mechanical components, such as a pop-up flags. In the embodiment of FIG. 1, visual indicators are used to help a person identify the various compartments 14. As will be later explained, the visual indicator 20 for a particular compartment door 16 is activated when the microprocessor opens that compartment door.

On the top surface 22 of the main storage unit 12 are programming controls 24. In the shown embodiment, a set of programming controls 24 is present for each of the compartments 14. However, it will be understood that in an alternate embodiment, a single set of programming controls can be used and shared by all compartments. The programming controls 24 shown are switches. A switch 26 exists for every hour of the day. By simply throwing the appropriate switches 26, each compartment can be programmed with the hour, or hours, that the door 16 for a particular compartment 14 is to open. The use of simple switches 26 for each of the compartments 14 provides a simplistic programming interface that is easy to understand by people who have no experience in programming electronic equipment. However, it will be understood that the use of multiple switches can be replaced with an electronic display and keyboard, should a manufacturer decide to apply advanced programming techniques to the invention.

Figure 2:
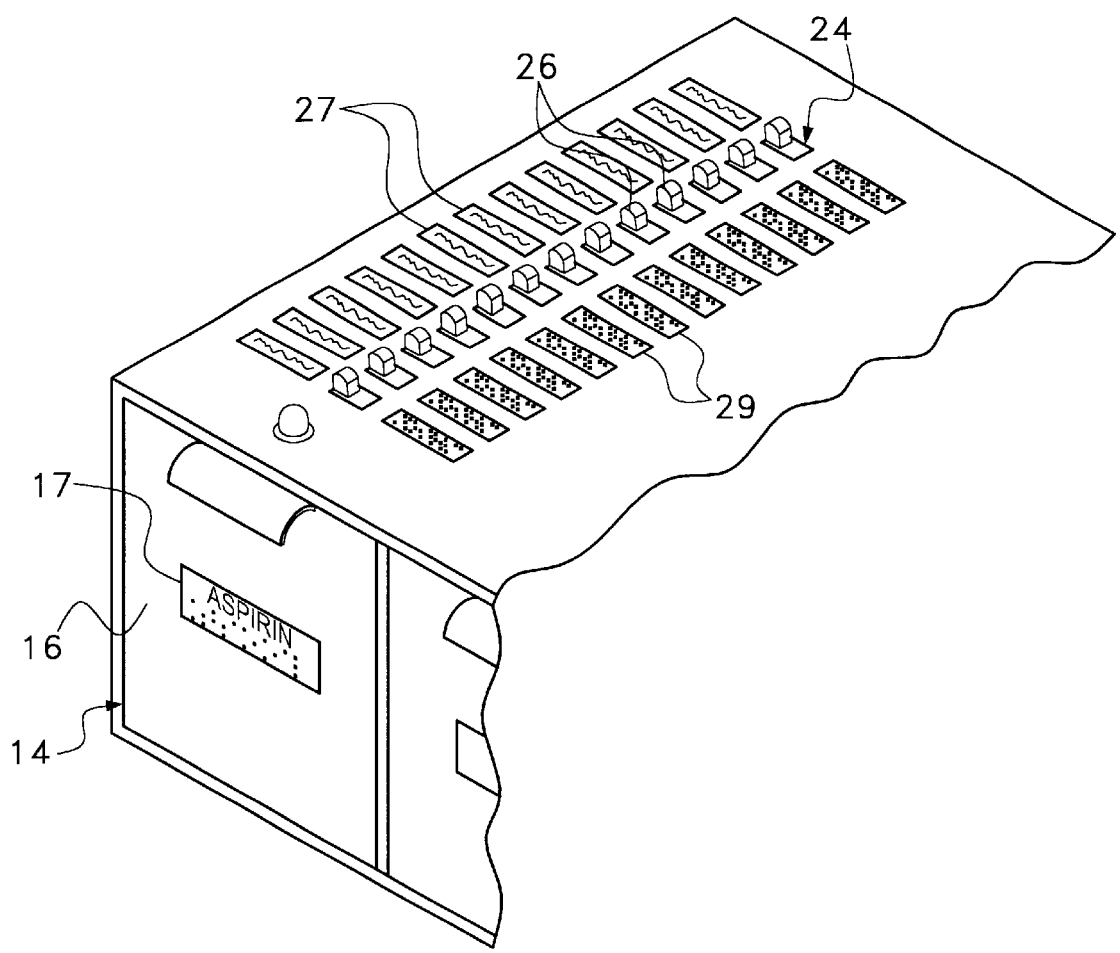
FIG. 2 is an enlarge view of a section of the dispensing system shown in FIG. 1.

Referring to FIG. 2, it can be seen that on each compartment door 16 is a label 17. The label contains large raised letters that identify the medication contained behind that door 16 in that compartment 14. In addition to the letters, a Braille indication of the medication is also provided. In this manner, a visually impaired person can be informed of the contents of the compartment 14.

On the top surface of the storage unit 12 are the programming controls 24. In the shown embodiment, the programming controls are shown as large switches 26. Each of the switches 26 is identified with two labels. The first label 27 has large raised printed letters that identify the switch 26. The second label 29 contains Braille that also identifies the switch 26. In this manner, the system can be programmed by the visually impaired.

Returning to FIG. 1, it can be seen that a portable paging unit 30 is provided as part of the dispensing system 10. The portable paging unit 30 interconnects with a receiving port 32 on the storage unit 12. The receiving port 32 contains electrical contacts that electrically interconnect with the portable paging unit 30 when the portable paging unit 30 is placed in the receiving port 32. As such, the portable paging unit 30 communicates with the main storage unit 12 directly through the receiving port 32. However, once removed, the portable paging unit 30 does not communicate with the main storage unit 12 until the portable paging unit 30 is again placed in the receiving port 32.

Figure 3A:
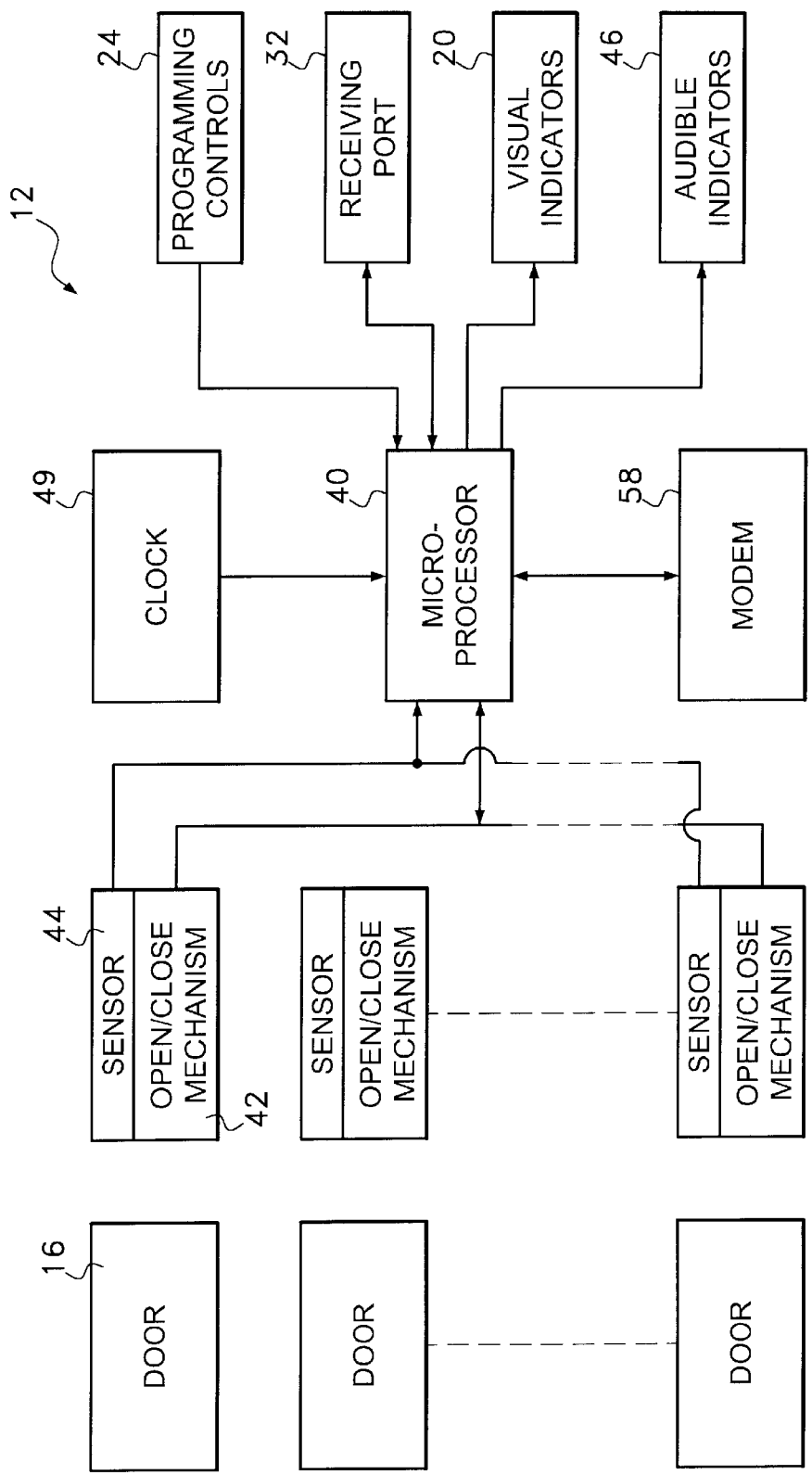
FIG. 3A is a schematic of the main storage unit of the dispensing system shown in FIG. 1.

Referring now to FIG. 3A, it can be seen that a microprocessor 40 is present within the main storage unit 12. The microprocessor 40 is coupled to a plurality of door opening mechanisms 42, wherein the door opening mechanisms 42 are connected to the compartment doors 16. The door opening mechanisms 42 are capable of opening and closing the various compartment doors 16. As such, it will be understood that the microprocessor 40 can open or close any of the compartment doors 16 at any preprogrammed time and in any combination or pattern.

A series of sensors 44 are also coupled to the microprocessor 40. At least one sensor 44 is associated with each compartment 14 (FIG. 1) in the main storage unit 12. The sensors 44 sense if any object has been taken from and/or placed into each compartment. The sensors 44 can be optical, ultrasonic or mechanical in nature, provided the sensors 44 detect whether or not the contents of the compartment have been added to, or removed.

As has been previously mentioned, the microprocessor 40 is coupled to a plurality of indicators. The indicators preferably include a plurality of visual indicators 20 and at least one audible indicator 46. As such, the microprocessor 40 can activate any of the visual indicators 20 and/or the audible indicator 46 as needed when executing a control program.

The microprocessor 40 in the main storage unit 12 runs operating software. The microprocessor 40 also monitors time via an internal clock 49. Time variables for taking medications are input into the operating software by the programming controls 24 (FIG. 1) present on the top surface of the main storage unit 12. Further variables may also be received by the microprocessor 40 via a telecommunications modem 58. The telecommunications modem 58 enables the microprocessor 40 to send and receive data to and from other computer systems using telecommunication transmission lines.

Figure 3B:
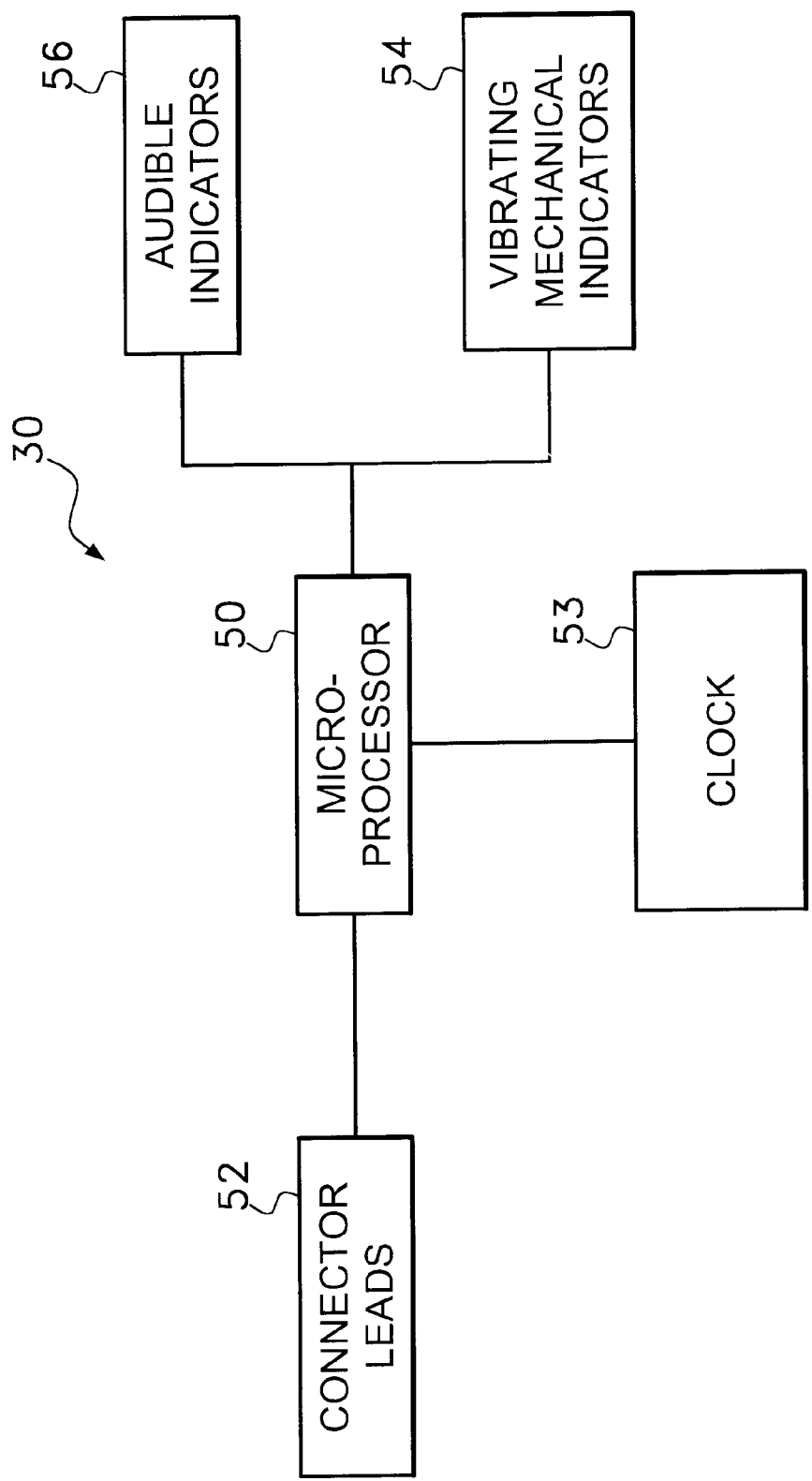
FIG. 3B is a schematic of the portable paging unit of the dispensing system shown in FIG. 1.

The microprocessor 40 in the main storage unit 12 is also directly coupled to the receiving port 32 that receives the portable paging unit 30. As such, when the portable paging unit 30 is placed in the receiving port 32, data can be directly exchanged through receiving port 32. As can be seen in FIG. 3B, the portable paging unit 30 contains its own microprocessor 50. The pager microprocessor 50 is coupled to connector leads 52 that directly engage the receiving port 32 on the main storage unit 12 when the portable paging unit 30 is placed in the receiving port 32. The pager microprocessor 50 is also coupled to an internal clock 53 so that the pager microprocessor 50 can monitor the passage of time. A vibrating mechanical indicator 54 and/or audible indicator 56 is provided in the portable paging unit 30 that can produce a vibrating mechanical indication and/or audible indication to the person carrying the portable pager unit 30. The vibrating mechanical indicator 54 and/or audible indicator 56 is also controlled by the pager microprocessor 50.

Figure 4:
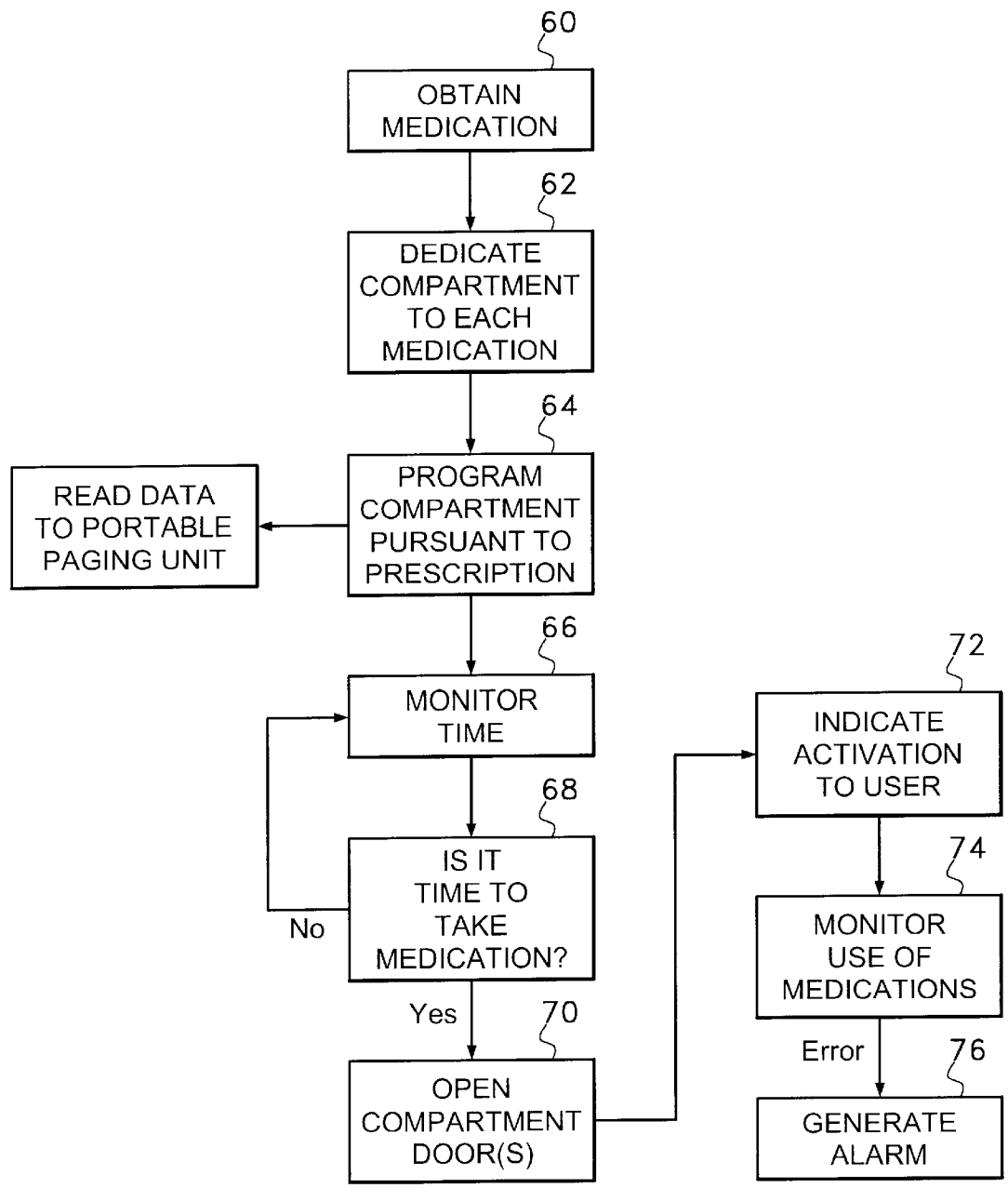
FIG. 4 is block diagram logic flow illustrating the method of operation of the present invention dispensing system.

Referring to FIG. 4, the method of operation of the present invention system can be explained. As is indicated by Block 60, a person obtains their prescription or over-the-counter medications from a drug store. Once the medications are obtained, the medications are taken to the main storage unit 12 (FIG. 1) and one compartment in the main storage unit is dedicated to each medication. See Block 62. The dosage information from those medications is then programmed into the main storage unit 12 (FIG. 1) using the programming controls 24 (FIG. 1). Block 64 shows the step of programming the main storage unit. Thus, if a medication should be taken at 6:00 A.M. and 6:00 P.M. each day, that medication is placed in one of the compartments. That compartment is then programmed with the 6:00 A.M. and 6:00 P.M. requirements. The medication is then placed in the compartment that has been programmed with the prescribed times for taking that medication. It makes no difference if the medication is a bottle of pills, a flask of liquid, a tube of cream, a can of powder or a canister of aerosol. As such, the device works as well with insulin and eye drops as it does for pills.

The microprocessor 40 (FIG. 3A) in the main storage unit 12 reads the times entered for the medications. Using its internal clock 49 (FIG. 3A), the microprocessor monitors the passage of time and compares actual time to the preprogrammed times. See Block 66 and Block 68. As is indicated by Block 70, the microprocessor opens the compartment door containing the medication to be taken, when the programmed time to take that medication matches the actual time. Simultaneously, the microprocessor activates the visual indicator for the open compartment and the audible indicator alarm. See Block 72. Upon seeing the visual indicator and/or hearing the audible indicator alarm, a person can be reminded to go to the dispensing unit. Once at the dispensing unit, that person takes the medication(s) from the open compartment(s) and self-administers those medications. The sensor in each compartment detects if the medications have been removed from the compartment and sends the microprocessor this information. See Block 74. If the sensors do not detect that the medications have been touched, an alarm condition is generated. The alarm condition can be transmitted by the main storage unit, using the visual indicators and audible indicators, or the alarm condition can be transmitted to a remote location via the modem. See Block 76.

Referring back to both FIG. 3A and FIG. 3B, it will be understood that if a person is not in visual range or audible range of the main storage unit 12, that person is reminded of the need to take medication via the portable paging device 30. After the times for taking the various medications are programmed into the main storage unit 12, the portable paging unit 30 is attached to its receiving port 32 on the main storage unit 12. Once connected in the receiving port 32, the programmed information is automatically downloaded to the pager microprocessor 50 within the portable paging unit 30. The pager microprocessor 50 also has a clock 53. When the actual time corresponds to a programmed medication time, the portable paging unit 30 generates a visual and/or audible indication to the person carrying the portable paging unit 30 that they should return to the main storage unit 12 for their medications or that they should obtain their medications from a different source. The portable paging unit 30 is program updated each time it is placed in its receiver port 32 on the main storage unit 12. Accordingly, the programming of the remote paging unit 30 matches that of the main storage unit 12 without the need for expensive telecommunication links between the two assemblies.

A hypothetical example of the use of the present invention device and method can be made with reference back to FIG. 1. A person must take two separate prescription medications. The first medication is a pill that should be taken once a day; the second is an inhaler that should be taken four times a day. The pill bottle containing the first medication is placed in one of the compartments 14 of the main storage unit 12. That compartment is programmed with the time 8:00 A.M. since the person usually is in the house at this hour and it is a convenient time to take the medication. The inhaler is placed in a second compartment 14. That second compartment is programmed with the times 8:00 A.M. 1:00 P.M., 6:00 P.M. and 12:00 A.M. because the inhaler should be taken four times a day and these times fit into the lifestyle of the person. After the times for both medications are entered, the portable paging unit 30 is placed in the receiver port 32 on the main storage unit 12. Once connected, the programmed times are automatically transferred to the portable paging unit 30. The person can then take the portable paging unit 30 with them as they travel throughout the day.

At 8:00 A.M. both the first and second compartments 14 on the main storage unit 12 will automatically open. Furthermore the visual indicators 20 of the first and second compartments 14 will activate and an audible indicator will activate. Simultaneously, the portable paging unit 30 will produce a vibrating and/or audible alarm. Upon seeing or hearing the indicators from either the main storage unit 12 or the portable paging unit 30, the person goes to the main storage unit 12 and sees that two of the compartments 14 are open. The person removes the medications from the open compartments 14 and self-administers the medications. When the medications are removed from the compartments 14, the sensor in the compartments send a signal to the microprocessor indicating that the medications have indeed been taken.

At 1:00 P.M. only the compartment door 16 for the inhaler will open because it is time to take only the inhaler medication. If the inhaler is not taken, an alarm condition is produced. The alarm condition can be seen/heard by the forgetful person and/or the alarm condition can be sent to any monitoring computer via the modem.

As such, it should be understood that the present invention system and method informs a person as to when medications should be taken, prevents the wrong medication from being taken, monitors if the correct medications have been taken and informs a third party of medications are missed.

It will be understood that the embodiment of the present invention described and illustrated is merely exemplary and a person skilled in the art can make many variations to the shown embodiment. For example, the number, shape, location and orientation of the compartments can be varied in a dispensing unit. Furthermore, there are many types of programming controls, visual indicators, audible indicators and data connection ports in the prior art. Many of these existing components can be adapted for use in the present invention. All such alternate embodiments and modifications are intended to be included within the scope of the present inventions as defined below in the claims.

What is claimed is:

1. A device for dispensing medications, comprising:
a storage assembly containing,
a plurality of compartments,
at least one mechanism for selectively opening each of said compartments in an automated manner;
a first microprocessor coupled to said at least one mechanism for selectively controlling said at least one mechanism;
a programming interface for programming at least one time into said first microprocessor for each of said plurality of compartments, wherein said first microprocessor selectively causes each of said plurality of compartments to open at said at least one time programmed for that compartment; and
a portable unit selectively connectable to said storage assembly, containing:
a second microprocessor, wherein said at least one time programmed into said first microprocessor is read into said second microprocessor when said portable unit is connected with said storage assembly;
a clock for determining when said at least one time is occurring;
an indicator, controlled by said second microprocessor, that provides an indication when said at least one time is occurring.

2. The device according to claim 1, wherein said indicator is selected from a group consisting of audible indicators and vibration indicators.

3. The device according to claim 1, further including at least one sensor disposed in each of said plurality of compartments for sensing if medication has been removed from that compartment.

4. The device according to claim 3, wherein said first microprocessor is coupled to said at least one sensor and generates an alarm signal when it is detected that medication has not been removed from an open compartment within a predetermined period of time.

5. The device according to claim 3, further including a modem coupled to said first microprocessor for transmitting said alarm signal to a remote location.

6. The device according to claim 1, further including indicators disposed on said storage assembly that provide an indication when one of said compartments is opened by said first microprocessor.

7. The device according to claim 6, wherein at least one indicator is associated with each of said compartments.

8. The device according to claim 7, wherein each of said indicators is selected from a group consisting of visual indicators, audible indicators and mechanical indicators.

9. A method of providing a person with an indication that a medication should be taken, comprising the steps of:
programming a central unit with prescription times regarding when at least one medication should be taken;
downloading said prescription times to a portable unit by temporarily electrically interconnecting said portable unit to said central unit;
tracking time in said portable unit and determining when said prescription times occur independently of said central unit;
creating an audible indication in said portable unit at times corresponding to said prescription times.

10. The method according to claim 9, further including the steps of placing the medications in said central unit and making said medications accessible only at times corresponding to said prescription times.

11. A method of dispensing medications, comprising the steps of:
providing a storage assembly containing a plurality of compartments that are selectively controlled by a microprocessor;
providing a portable unit that is selectively attachable and detachable to said storage assembly, wherein said portable unit electrically interconnects with said microprocessor in said storage assembly when said portable unit is attached to said storage unit;
assigning one of said plurality of compartments in said storage assembly to a particular medication;
programming the microprocessor with the times when a certain medication is to be taken, wherein said microprocessor automatically opens the compartment containing that medication when said times come to pass;
downloading said times from said microprocessor to said portable unit whenever said portable unit is engaged with said storage assembly, wherein said portable unit tracks said times independently from said microprocessor in said storage assembly; and
providing an indication on said portable unit when said times arrive.

12. The method according to claim 11, wherein said step of assigning one of said plurality of compartments includes placing each medication in a separate one of said compartments.

13. The method according to claim 11, wherein said step of providing a storage assembly includes providing a storage assembly having a separate programming interface associated with each of said plurality of compartments.

14. The method according to claim 13, wherein said step of programming the microprocessor includes programming the microprocessor of each of said compartments using the programming interface associated with each of said compartments.

15. The method according to claim 13, wherein said step of providing an indication on said portable unit includes producing an audible alarm in said portable unit.

16. The method according to claim 13, further including the step of providing an indication on said storage assembly corresponding to which of said plurality of compartments are opened by said microprocessor.

17. The method according to claim 16, wherein said indication includes lighting at least one light.

* * * * *